INVENTOR.
DEAN D. RIGGS
BY
Schramm, Kramer & Sturges
ATTORNEYS.

INVENTOR.
DEAN D. RIGGS
BY
Schramm, Kramer & Sturges
ATTORNEYS.

INVENTOR.
DEAN D. RIGGS
BY
Schramm, Kramer & Sturges
ATTORNEYS.

United States Patent Office 3,425,047

Patented Jan. 28, 1969

3,425,047

MAGNETIC TRACE RECORDER WITH TRACE-FOLLOWING HALL EFFECT READOUT HEAD

Dean D. Riggs, Cleveland, Ohio, assignor to Electron Ohio, Inc., a corporation of Ohio Filed Feb. 15, 1965, Ser. No. 432,545

U.S. Cl. 340—174.1 6 Claims

Int. Cl. G11b *5/38*

ABSTRACT OF THE DISCLOSURE

An analog recording device in which a magnetic track is recorded along a magnetic surface with the track being of constant amplitude and width and its transverse position varying with the input signal. The track is read by a thin Hall effect crystal disposed substantially parallel to the magnetic surface so that when the crystal is centered, the magnetic flux balances out and there is no Hall effect current. The crystal may be excited either by DC current or AC current and in the former case the output signal will vary in plurality and magnitude with displacement of the crystal and with AC it will vary in phase with the input. The write and read heads may be mounted on either separate lead screws or the same lead screw and drive motors and a potentiometer balance circuits are used so that the read head will move transversely of the magnetic surface to follow the track created by the write head and thereby reproduce the analog signal.

This invention relates to magnetic memory systems and concerns particularly recorders and programmers.

An object of the invention is to record analog signals very precisely and to enable positions represented by an analog signal curve to be reproduced accurately and with a high degree of repeatability.

A further object of the invention is to provide a programmer for movable machine elements and for processing and manufacturing conditions in which the program may very readily be set up and removed when no longer desired.

Other and further objects, features and advantages of the invention will become apparent as the description proceeds.

In carrying out the invention in accordance with a preferred form thereof, a movable recording member having a magnetizable surface such as a magnetic drum, strip or tape is utilized with means for moving the magnetizable surface in a given direction and carriage means for moving a read head and a write head in a transverse direction. The write head is in the form of a magnet which forms magnetic poles of opposite polarity side by side on the magnetic surface as relative movement takes place between the surface and the write head.

The read head is a flux-sensitive position indicator such as a Hall effect crystal element, for example, with an electrical excitation circuit and output leads. A suitable position-indicating transducer is provided for causing the write head to traverse the surface with its carriage in accordance with variations in a signal to be recorded. For example, a self-balancing potentiometer may be employed with a servo motor responsive to unbalance between potentiometer output and signal input for positioning the write head.

Means responsive to the voltage output of the flux-sensitive indicator of the read head is employed for causing the read head to traverse the magnetizable surface along the magnetic trace produced by the write head. For this purpose a servo motor may be employed, which is controlled by a phase-sensitive amplifier, responsive to the output of the flux-sensitive indicator.

A better understanding of the invention will be afforded by the following detailed description considered in conjunction with the accompanying drawings in which.

Figure 4:
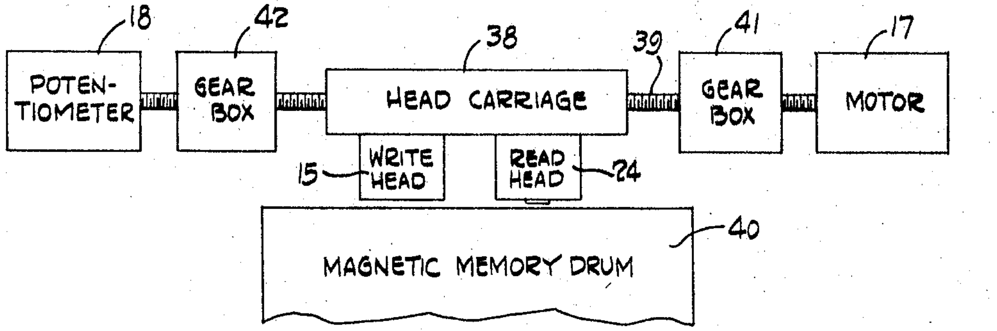
FIG. 4 is a schematic diagram of a modification in the arrangement of FIG. 1, in which a magnetic memory drum is employed instead of a moving magnetizable-surface chart and a common carriage is employed for the write head and the read head, so that the apparatus may be used as a programmer in which the read head subsequently reproduces the programmed motion of the write head.
Figure 7A:
Figure 8:
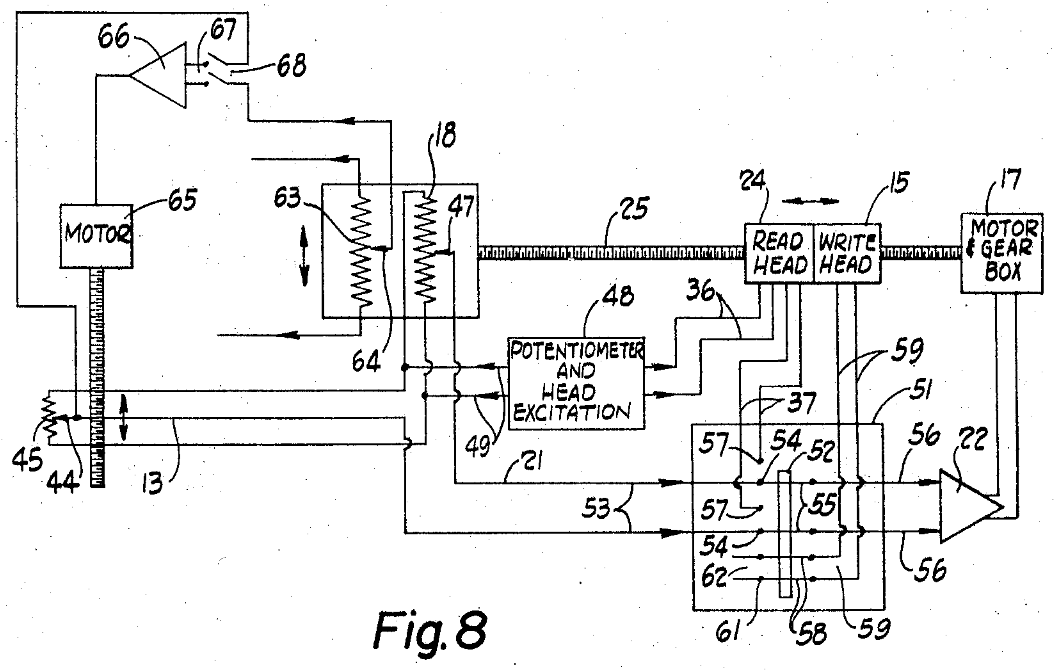
Figure 9:
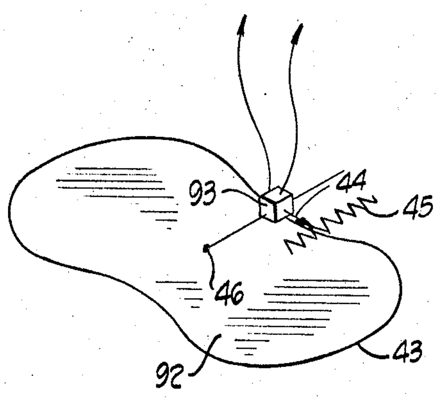
Figure 10:
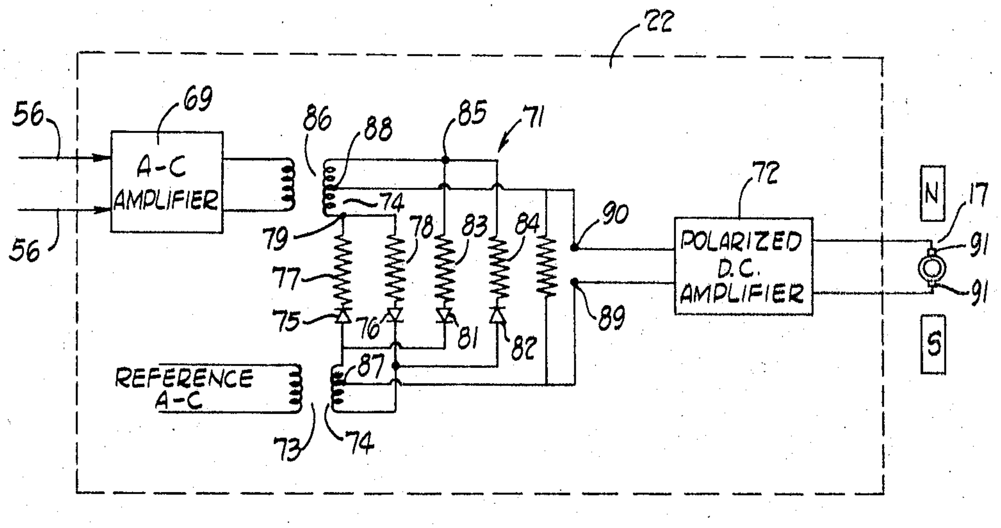

FIGS. 7*a*, *b* and *c* are diagrams illustrating the manner in which the Hall effect crystal responds to the magnetization of the magnetizable surface in order to provide directional sensitive response of the read head;

FIG. 8 is a circuit diagram of the apparatus of FIG. 4;

FIG. 9 is a diagram illustrating the manner in which the apparatus of FIGS. 4 and 8 may be employed as a programmer for a welder; and FIG. 10 is a circuit diagram of the phase-sensitive amplifier circuit employed in the apparatus of FIG. 9.

Like reference characters are utilized throughout the drawings to designate like parts.

Figure 1:
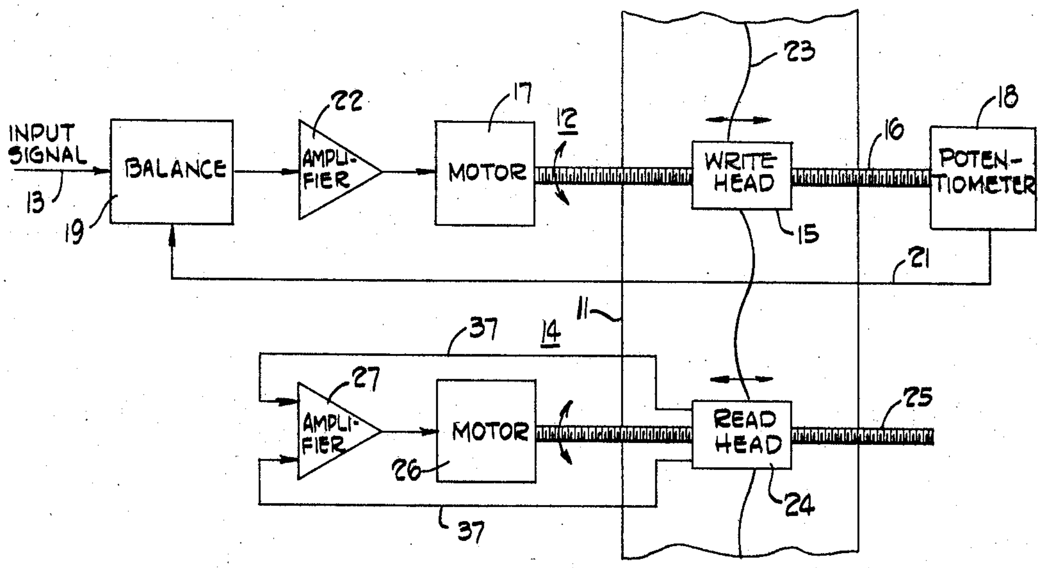
FIG. 1 is a schematic and block circuit diagram of an analog recording device in accordance with the invention.

In the embodiment of the invention illustrated in FIG. 1 an analog recorder is provided comprising a moving strip or chart 11, magnetic writing apparatus 12, and magnetic reading apparatus 14. There are suitable conventional means for advancing the chart longitudinally (not shown). The chart 11 has a magnetizable surface such as a coating of magnetic oxide on a Mylar base, for example. The magnetic writing apparatus 12 is responsive to an input signal received through a channel 13.

The writing apparatus 12 comprises a write head 15 including means for magnetizing a portion of the surface of the chart 11 under the head 15, preferably with a minute area magnetized to provide external lines of force in a direction transverse to the longitudinal direction of the chart 11. A lead screw 16 is provided for moving the write head 15 across the chart 11, and a motor 17 is provided for driving the lead screw 16. In order that the position of the write head 15 will correspond to the magnitude of the signal, assumed to be a voltage signal, in the input channel 13, a position-indicating transducer such as a potentiometer 18 and a balance circuit 19 are provided.

The potentiometer 18 is suitably excited and provided with a tap (not shown in FIG. 1) connected to an output line 21 connected to the balance circuit 19 of FIG. 1 so that the voltages on the input channel 13 and the potentiometer output line 21 may be compared for causing the motor 17 to run in one direction or another until the voltages are in balance. It will be understood that the potentiometer tap is also driven by the lead screw 16.

As shown in FIG. 1, an amplifier 22 is interposed between the balance circuit 19 and the motor 17. Either alternating-current or direct-current circuits may be employed and it will be understood that the circuits are modified according to whether alternating-current or direct-current is employed.

As the chart 11 is moved longitudinally and the magnitude of the signal in the input channel 13 varies, the write head 15 will be moved back and forth across the surface of the chart 11 to produce a magnetic trace 23.

The variations in magnitude of the input signal at the channel 13 are reproduced by the magnetic trace 23. The reading apparatus 14 contains a read head designed to respond to the magnetic trace so as to move back and forth across the chart 11 in the same manner as the write head 15 previously moved back and forth across the chart. In the arrangement, as illustrated, the reading apparatus 14 serves as a delay device with the magnetic trace 23 on the chart 11 serving as a memory. It will be understood, however, that the invention is not limited to delay devices and the chart 11 may be utilized for indefinite storage of information if desired.

The reading apparatus is also provided with a lead screw 25 driving the read head 24 and driven by a motor 26, which is in turn responsive to polarized output signals from the read head 24 preferably through an amplifier 27. As will be explained more fully hereinafter, the read head 24 includes a magnetic flux detector so designed as to produce an electrical signal having a polarity or a phase relationship dependent upon whether the read head is situated to the right or to the left of the magnetic trace 23. Consequently the amplifier 27 and the motor 26 are enabled to restore the read head 24 to the position in which it precisely straddles the magnetic trace 23.

Figure 2:
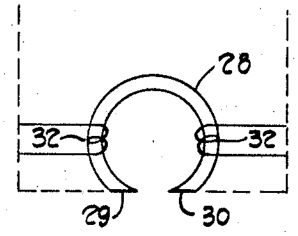
FIG. 2 is a diagram of a magnetic write head which may be employed in the apparatus.

A suitable form of magnetizing element for the write head 15 is illustrated in FIG. 2. It will be observed that this takes the form of a magnetic core 28 of suitable material such as soft iron or other readily magnetizable laminations or wires having a pair of pole faces 29 and 30 which are supported by the write head 15 over and as close as practicable to the magnetizable surface of the chart 11. For magnetizing the core 28 excitation windings 32 are provided and a direct-current source of excitation (not shown in FIG. 1) is utilized. The invention is not limited thereto, however, and does not exclude the use of a permanent magnet in the write head although solenoid excitation has the advantage that it may be turned off when the strip 11 is to be demagnetized for removing a trace preparatory to a subsequent operation.

Figure 3:
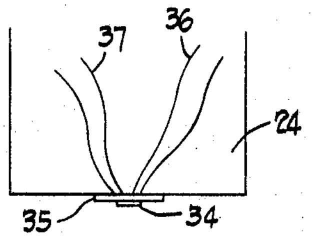
FIG. 3 is a diagram of a read head carrying a Hall effect crystal.

As illustrated in FIG. 7, the write head of FIG. 2 produces a pair of magnetic poles indicated by the letters N and S at the surface of the magnetizable strips or surface 11 which are spaced apart upon a line perpendicular to the longitudinal direction and the direction of motion of the sheet or chart 11. The read head 24 is provided with a suitable detector responsive to the transversely extending lines of magnetic flux 33. Preferably such magnetic flux detector takes the form of a Hall effect crystal 34. Although the flux-sensitive position indicator has been shown as a Hall effect crystal, the invention is not limited thereto and does not exclude the use of other flux-sensitive elements such as bistable ferromagnetic cores, for example, in which the output in response to a magnetic flux depends upon the previous polarity and magnetic condition of the core and intermittent "sensing" impulses are applied to the core to obtain indications of its magnetic condition as effected by the location of the magnetic trace on the chart 11. As shown in FIG. 3, the Hall effect crystal 34 is preferably a thin film of semi-conductor mounted upon a substrate 35 such as a block of ceramic non-magnetic insulator or a block of ferrite mounted upon the read head 24. The Hall effect crystal 34 is provided with a pair of excitation leads 36 and a pair of output leads 37. The crystal unit 34 may be a conventional unit composed of indium-arsenide such as manufactured by the F. W. Bell Company of Columbus, Ohio.

Figure 5:
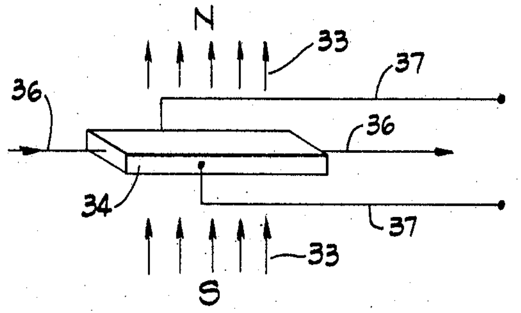
FIG. 5 is a schematic diagram of a Hall effect crystal film illustrating the principle of operation involved therein.

As illustrated in FIG. 5, the Hall effect crystal 34 is so positioned that it extends transversely with respect to the magnetizable surface chart 11 with the excitation leads 36 causing electrical current to flow through the Hall effect crystal 34 longitudinally, which is transverse with respect to the direction of motion of the magnetizable surface chart 11, with the lines of magnetic flux 33 rising from the surface of the chart 11 passing through the Hall effect crystal 34 and with the output leads 37 connected on opposite sides of the crystal film 34.

As known by those skilled in the art, when a current is passed longitudinally through a Hall effect crystal strip and magnetic flux passes through the crystal strip perpendicular to the plane of the crystal strip, a potential difference occurs between the edges of the crystal strip. This potential difference is applied to the motor 26 through the amplifier 27 as shown in FIG. 1. The excitation may be either direct-current or alternating-current depending upon whether the amplifier 27 is designed to respond to direct-current and to detect polarity thereof or is designed to respond to alternating-current and detect the phase relationship thereof. As will be understood, at any given instant the polarity of the potential difference between the leads 37 depends upon the direction of magnetic flux 33 through the plane of the crystal 34.

Figure 6:
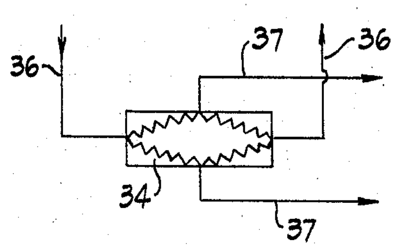
FIG. 6 is a diagram of the Hall effect crystal equivalent bridge circuit.
Figure 7B:
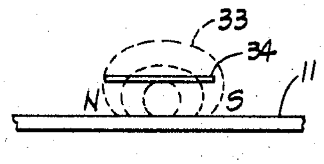
Figure 7C:
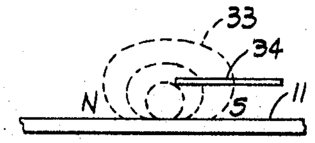

As represented diagrammatically in FIG. 6, the Hall effect crystal 34 is equivalent to a bridge circuit which remains balanced so long as there is no magnetic flux or the magnitude of magnetic flux passing through the plane of the crystal 34 in one direction is equal to that flowing in the opposite direction, such as occurs when the Hall effect crystal is centered on the magnetic trace 23 in the position illustrated in FIG. 7*b*. On the other hand, when the Hall effect crystal 34 lies in unsymmetrical relationship on one side or the other side of the magnetic trace 23 as illustrated in FIG. 7*a* or 7*c*, a potential difference occurs between the output leads 37 and the polarity of this potential difference at any given instant depends upon whether the Hall effect crystal 34 lies to one side or the other side of the magnetic trace 23 as shown diagrammatically in FIGS. 7*a* and 7*c*.

The principle of the invention may be carried out also in programmers or other devices where reading and writing do not go on simultaneously and the read head and write head may be mounted upon a common carriage 38 in threaded engagement with a common lead screw 39. The latter is mechanically connected to the motor 17 and the potentiometer 18, preferably through speed reduction gear boxes 41 and 42 so that a more efficient small, high speed motor may be employed; and the potentiometer 18 may be in the form of a single turn ring potentiometer. It will be understood that suitable switching arrangements are employed so that the potentiometer 18 is connected when needed and the motor 17 is rendered responsive to either the input signal potentiometer or the read head according to which function is being performed. Although a moving strip, tape, or chart 11 has been shown in FIG. 1 by way of example, it will be understood that the invention is not limited to the use of such a flat sheet with a magnetizable surface and does not exclude the use of rotary memory members such as a memory drum 40 as shown in FIG. 4. The memory drum 40, the axis of which is not shown in FIG. 4, has a surface which is magnetizable being coated with magnetic iron oxide, for example, or may be aluminum, plated with nickel or other metal or alloy which is magnetizable.

An application of the programmer of FIG. 4 to the programming of the motion of a welding head according to the shape of a piece to be welded is illustrated in FIG. 8 and FIG. 9. It is assumed that it is desired to cause a welding head to move around an outline or path 43 of irregular shape and to follow this path one or more times in succession. In order to accomplish this a program is introduced into the machine of FIG. 8 by causing the tracing point of an actutaor 93 in the form of a slide tap 44 on a potentiometer 45 to travel back and forth in proportion to the distance of the outline 43 from a center point 46 as the tracing point attached to the potentiometer tap 44 is caused to trace the outline 43. A conductor 13 is connected to the potentiometer tap 44 and represents the input signal line of FIG. 1.

The apparatus of FIG. 8 is assumed to be operated with alternating-current excitation and with a direct-current motor 17. Accordingly the amplifier 22 is designed for responsiveness to phase and magnitude of an alternating-current and to supply a direct-current representative thereof in magnitude and polarity to the motor 17. The potentiometer 18 has a sliding tap 47 rotated by the lead screw 25 through a gear reduction (not shown) so connected that the voltage thereof opposes the voltage appearing at the potentiometer tap 44 in the input circuit to the phase-sensiive amplifier 22.

In the embodiment of FIG. 8 alternating-current excitation is employed and an alternating-current power supply 48 is provided having output leads 49 connected across the potentiometers 18 and 45 and output leads 36 exciting the Hall effect crystal of the read head 24. The invention is not limited to the use of either alternating-current or direct-current or to alternating-current of any specific frequency but by way of example the power supply source 48 may be a 1200-cycle supply.

In order that the apparatus may be caused to function alternately for either programming or following a program, that is for either writing or reading, a read-write switching unit 51 is provided. Although electronic switching may be employed or relays or the like, for the sake of illustrating the switching functions to be performed, the switching unit 51 has been represented schematically as consisting of mechanical switches controlled by a gang-switch handle 52. A pair of input leads 53 from potentiometer taps 44 and 47 are connected to stationary terminals 54, adapted to cooperate with a pair of movable contacts 55 connnected to input leads 56 to the amplifier 22. The switch contacts 55 are shown in the write position. Also cooperating with the movable contacts 55 is an alternative pair of stationary contacts 57 connected to the output leads 37 of the Hall effect crystal 34. The switch handle 52 is connected also to a pair of movable contacts 58 connected to magnet-energizing leads 59 for the write head 15. Cooperating with the movable contacts 58 is a pair of stationary contacts 61 connected to a source of direct-current 62 for causing the current to flow through the write head excitation winding 32 when the switching unit 51 is in the write position.

In practice the switching unit 51 is provided with an additional position for energizing erasing coils (not shown) and produce rotation of the drum 40 through a complete revolution after the program has been carried out and it is desired to introduce a new program. The erasing device, however, does not constitute a part of the present invention and is omitted for simplicity.

When it is desired to employ the apparatus of FIG. 8 for programming a moving device such as a welding head in accordance with a program produced by motion of the actuator and the potentiometer tap 44, and represented by a magnetic trace such as the magnetic trace 23 of FIG. 1; an additional potentiometer, namely, a read-out potentiometer 63 is provided having a movable tap 64 which is mechanically connected to move with the movable tap 47 as driven by the lead screw 25.

A motor 65 is provided for producing radial movement of a welding head in response to the program. The motor 65 is energized by an amplifier 66 having a pair of input leads 67 at which appear voltages to be compared, from the read-out potentiometer tap 64 and the actuator potentiometer tap 44 which is mechanically connected also to the welder. Switches 68 are provided in the input to the amplifier 66 which are open during the write operation and closed during the read operation. Preferably these switches are included in the switching unit 51 and operate simultaneously with those controlled by the handle 52 representing schematically the interlock between the switches.

When alternating-current excitation is employed, the amplifiers 22 and 66 are such as to respond to the magnitude and phase relationship of input voltage and to produce an output representative thereof, which is a polarized direct-current in case the motor 17 is a direct-current motor. The amplifier 22 may take any suitable form, for example, as illustrated in FIG. 10 there may be one or more stages of alternating-current amplification 69 followed by a phase-sensitive detector 71 and one or more stages of direct-current amplification 72 which produces a direct-current having a magnitude polarity dependent upon the magnitude and phase of the input alternating-current voltage.

The phase-sensitive detector 71 may take the form of two pairs of rectifiers, each pair connected opposite to the other across a reference voltage source in series with voltage divider resistors. Thus in the specific apparatus illustrated there is a reference voltage transformer 73 connected to the same voltage source which energizes the lines 49 and 36. The transformer 73 has a secondary winding 74. Rectifiers 75 and 76 are connected to the winding 74 with the same polarity in series with resistors 77 and 78, having a common terminal or center tap 79. Rectifiers 81 and 82 are also connected in series with resistors 83 and 84 having a center tap 85 across the secondary winding 74. The rectifier 82 is connected with the same polarity as the rectifier 81 but both rectifiers 81 and 82 have the opposite polarity to the rectifiers 75 and 76. The resistance, common terminals 79 and 85 are connected to the opposite end terminals of a secondary winding 86 of the output transformer for the AC amplifier 69. The transformer windings 74 and 86 have center taps 87 and 88, respectively, connected to the input terminals 89 and 90 of the polarized direct-current amplifier 72.

The motor 17 may take the form of a permanent magnet field motor with the output of the direct-current amplifier 72 connected directly to the motor armature through brushes 91.

The operation of the apparatus is as follows:

When the operator desires to program a welding operation, he rotates a workpiece 92, as shown in FIG. 9, causing the actuator head 93 (carrying the potentiometer slide tap 44) to follow the contour along which a weld is to be made. Linkage (not shown) is provided for synchronizing the rotation of the workpiece 92 with the magnetic memory drum 40. As the workpiece rotates, the actuator is moved back and forth according to variations in the radial distance of the desired weld line from the center 46. This causes the potentiometer tap 44 to move back and forth and reproduce its movement in a magnetic trace 23 on the drum 40. This occurs as a result of the voltage comparison between the potentiometer tap 44 and the tap 47 of the potentiometer 18, which acting through the amplifier 22, causes the motor 17 and the lead screw 25 to rotate in one direction or the other carrying the write head 15 and the potentiometer tap 47 until voltage balance occurs. This indicates that the position of the write head 15 transversely on the magnetic memory drum 40 represents the position of the actuator.

After a complete trace of the desired line of weld has been made, the switching mechanism 51 is switched from the position shown to the upward or read position and the apparatus is again started. The read head 24 is now connected to the input leads of the amplifier 22. As the magnetic memory drum 40 rotates and the magnetic trace 23 curves in one direction or the other, the read head 24 and the Hall effect crystal 34 are subjected to unbalanced magnetic flux until the energization of the motor 17 moves the read head to a corrected direction to bring the flux effect on the Hall effect crystal into balance and to produce a null voltage in the input to the amplifier 22. Rotation of the lead screw 25 representing movement of the read head 24 is communicated also to the read-out potentiometer tap 64 which produces an unbalance in the voltage input to the amplifier 66 until the motor 65 drives the welding head in one direction or the other to bring the applied voltages into balance and produce a null input at the input lead 67 to the amplifier 66 bringing the motor 65 to a stop. If it is desired to apply a plurality of layers of material to the weld seam, the operation is continued in the read-out position of the changeover switch 51 for the desired number of revolutions of the workpiece and the magnetic memory drum 40. Then the switches are opened and by conventional means (not shown) the magnetic memory drum 40 is rotated with a demagnetizing head energized to remove the magnetic trace previously produced in order that a new program may be carried out.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

What is claimed is:

1. A memory system comprising in combination a magnetizable surface, magnet means having opposite poles adjacent said surface, means for producing relative movement of said magnet means and said magnetizable surface in a given direction, means for moving said magnet means transverse to said given direction in response to an input signal to produce fluctuating parallel traces of opposite magnetic polarity along said surface, a magnetic flux detector, said magnetizable surface and said detector being relatively movable, said detector comprising a substantially flat Hall effect crystal arranged substantially parallel to said magnetizable surface, means for electrically exciting said crystal, means for sensing the Hall effect current in said crystal, and means responsive to said Hall effect current for causing said detector to trace the fluctuating parallel traces at the minimum of said Hall effect current between said traces.

2. A memory system as set forth in claim 1 wherein said means for electrically exciting said crystal is a direct-current and said detector means detects the polarity and magnitude of said Hall effect current.

3. A memory system as set forth in claim 1 wherein said means for electrically exciting said crystal is an alternating-current, and said detector means senses the phase shift between the Hall effect current and said exciting current.

4. A memory system comprising in combination a magnetic memory surface with means for moving it in a given direction, carriage means movable in a direction transverse to said given direction, a magnetic write head movable with said carriage means and arranged to produce parallel traces of opposite magnetic polarity on said memory surface, a flux sensitive read head unit movable with the carriage means, said read head including a substantially flat Hall effect crystal arranged substantially parallel to said memory surface, means for electrically exciting said crystal, means to detect the Hall effect current in said crystal, voltage producing actuator, a position indicating transducer having a voltage output tap, motor means connected effectively in circuit with said transducer tap and said voltage producing actuator, with said actuator in opposition to the transducer tap, whereby a differential voltage is produced for driving the motor in one direction or the other until the voltages of the transducer tap and the actuator are in balance, said transducer tap and said carriage means being mechanically connected to said motor so as to be driven thereby, means for selectively energizing the write head or the read head whereby when the write head is energized said magnetic traces are produced on the magnetic surface at a position in response to output of the actuator and when the said read head is energized it is caused to follow in position said traces on said magnetic surface at the minimum of said Hall effect current between said traces.

5. In the memory system a member having a magnetizable surface adapted to have a magnetized track produced along said surface, said track being in the form of a pair of parallel traces of opposite magnetic polarity extending in a given direction with respect to said surface, a read head with means for causing relative movement between said surface and said head in said given direction and in a direction transverse thereto, a substantially flat Hall effect crystal mounted in said read head substantially parallel to said surface and in alignment with said given direction, means for electrically exciting said crystal in said given direction and output leads connected to points on the Hall effect crystal along the line transverse to the direction of excitation, said means for producing relative movement between the read head and the magnetizable surface in said given direction comprising an electric motor, a position indicating transducer having an output variable with the rotation of said motor and a circuit for energizing said motor having an input in which the transducer output and the Hall effect output leads are balanced for causing rotation of the motor in one direction or another to cause the read head to remain in alignment between the magnetic traces on the magnetic surface where the Hall effect current is at a minimum.

6. An analog recorder comprising in combination a member having a magnetizable surface adapted to be moved in a given direction, a write head having a first lead screw for moving it back and forth across said surface in a direction transverse to the direction of movement thereof, a read head having a second lead screw for driving it back and forth along said surface in a direction transverse to the direction of motion of the surface, a first motor mechanically connected to drive said first lead screw, a position indicating transducer mechanically connected to said first lead screw having a voltage output variable in response to rotation of said first lead screw, an input channel for producing a voltage variable in response to variations in the input, a circuit for balancing said position indicating transducer voltage and said input voltage and means for energizing said first motor in response to said balance circuit whereby the motor drives the write head to a position representing the magnitude of the input signal, a magnet carried by said write head having a pair of poles in proximity to the magnetizable surface aligned with the transverse direction of said magnetizable surface for producing a pair of adjacent magnetic traces on said surface, a substantially flat Hall effect crystal carried by the read head in proximity to and substantially parallel with said magnetizable surface, means to electrically excite said crystal, said crystal having output leads for the Hall effect current produced by said crystal, a second motor drivingly connected to said read head lead screw and a voltage responsive amplifier having an input connected to said output leads and an output connected to said second motor whereby second motor rotates the second lead screw and moves the read head in a transverse direction to follow the magnetic traces placed upon the magnetizable surface by the write head with said crystal located where said Hall effect current is at a minimum.

References Cited

UNITED STATES PATENTS

| | | | |
|---|---|---|---|
| 2,464,708 | 3/1949 | Moseley | 346—32 |
| 3,017,486 | 1/1962 | Greene | 340—174.1 |
| 3,041,416 | 6/1962 | Kuhrt | 179—100 |
| 3,234,443 | 2/1966 | Clack | 346—33 |

STANLEY M. URYNOWICZ, Jr., *Primary Examiner.*

LEE J. SCHROEDER, *Assistant Examiner.*

U.S. Cl. X.R.

318—19; 346—32, 74